United States Patent
Ramsey et al.

(10) Patent No.: US 11,933,258 B2
(45) Date of Patent: Mar. 19, 2024

(54) GENERATOR MODULE

(71) Applicant: Schaeffler Technologies AG & Co. KG, Herzogenaurach (DE)

(72) Inventors: John Ramsey, Mansfield, OH (US); Matthew Payne, Glenmont, OH (US); Michael Condo, Clinton, OH (US); Aaron Mueller, Mansfield, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 88 days.

(21) Appl. No.: 17/864,481

(22) Filed: Jul. 14, 2022

(65) Prior Publication Data
US 2024/0018929 A1    Jan. 18, 2024

(51) Int. Cl.
*F02N 11/04* (2006.01)
*H02K 7/18* (2006.01)

(52) U.S. Cl.
CPC ........... *F02N 11/04* (2013.01); *H02K 7/1815* (2013.01)

(58) Field of Classification Search
CPC .................................................. H02K 7/1815
See application file for complete search history.

(56) References Cited

U.S. PATENT DOCUMENTS

| 3,285,524 | A | * | 11/1966 | Stratford | B02C 2/10 |
| | | | | | 241/259.1 |
| 5,519,275 | A | * | 5/1996 | Scott | H02K 11/0094 |
| | | | | | 310/216.057 |
| 2008/0051249 | A1 | | 2/2008 | Maenner | |
| 2010/0230227 | A1 | | 9/2010 | Parsons | |
| 2016/0281711 | A1 | | 9/2016 | Moetakef | |
| 2022/0154675 | A1 | | 5/2022 | Payne et al. | |

FOREIGN PATENT DOCUMENTS

| JP | 2017524111 A | 8/2017 |
| WO | 2008010669 A1 | 1/2008 |

\* cited by examiner

*Primary Examiner* — Sean Gugger

(57) ABSTRACT

A generator module for a vehicle includes a housing with a first conical surface, a rotor assembly with a second conical surface, aligned with the first conical surface, and a spring arranged to push the second conical surface into contact with the first conical surface. In an example embodiment, the first conical surface or the second conical surface includes a plastic surface or a friction paper surface. In an example embodiment, the rotor assembly is axially displaceable within the housing to compress the spring and move the second conical surface away from the first conical surface.

17 Claims, 4 Drawing Sheets ure is removable to access the threaded plug. In an example embodiment, the sealing cap is coaxial with the pump shaft.

GENERATOR MODULE

TECHNICAL FIELD

The present disclosure relates generally to a generator module, and more specifically to a generator module for a vehicle.

BACKGROUND

Generator modules are known. One example is shown and described in commonly-assigned United States Patent Application Publication No. 2022/0154675 titled STARTER-GENERATOR WITH POWER ELECTRONIC UNIT to Payne et al., hereby incorporated by reference as if set forth fully herein.

SUMMARY

Example aspects broadly comprise a generator module for a vehicle includes a housing with a first conical surface, a rotor assembly with a second conical surface, aligned with the first conical surface, and a spring arranged to push the second conical surface into contact with the first conical surface. In an example embodiment, the first conical surface or the second conical surface includes a plastic surface or a friction paper surface. In an example embodiment, the rotor assembly is axially displaceable within the housing to compress the spring and move the second conical surface away from the first conical surface.

In an example embodiment, the generator module includes a seal, and the rotor assembly is sealed to the housing by the seal. In an example embodiment, the rotor assembly includes a crankshaft mounting flange with an axial protrusion arranged for inserting into a receiving hole in an engine crankshaft. In an example embodiment, the generator module includes a shipping strap fixed to the rotor assembly and to the housing to maintain position of the rotor assembly relative to the housing during transport of the generator module.

In some example embodiments, the generator module includes a pump shaft rotationally fixed to the rotor assembly, and the spring is arranged to push the pump shaft. In an example embodiment, the generator module includes a gerotor for a gerotor pump arranged in the housing, and the pump shaft is rotationally fixed to the gerotor. In an example embodiment, the spring is coaxial with the pump shaft.

In some example embodiments, the generator module includes a bearing. The housing has an annular wall and the bearing is arranged between the spring and the annular wall. In an example embodiment, the spring wraps around the pump shaft. In an example embodiment, the housing includes a housing body with the first conical surface, and a pump cover fixed to the housing body and including the annular wall. In an example embodiment, the generator module includes a washer disposed axially between the spring and the bearing.

In some example embodiments, the generator module includes a threaded plug, and the threaded plug is threaded into the housing to compress the spring against the pump shaft. In an example embodiment, the threaded plug is coaxial with the pump shaft. In an example embodiment, the generator module includes a sealing cap installed in the housing, and the sealing cap is removable to access the threaded plug. In an example embodiment, the sealing cap is coaxial with the pump shaft.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
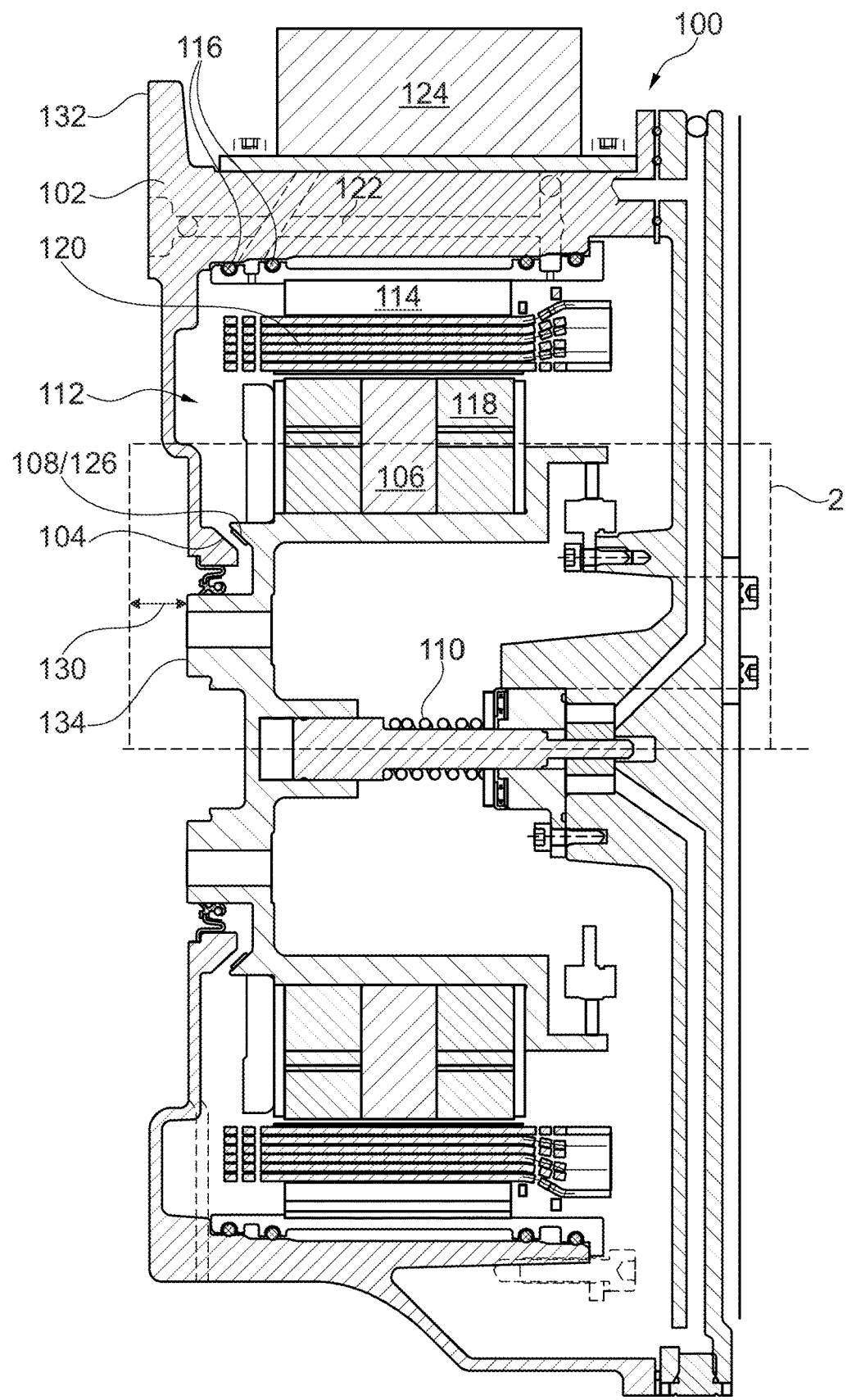
FIG. 1 illustrates a cross-sectional view of a generator module according to a first example embodiment.
Figure 2:
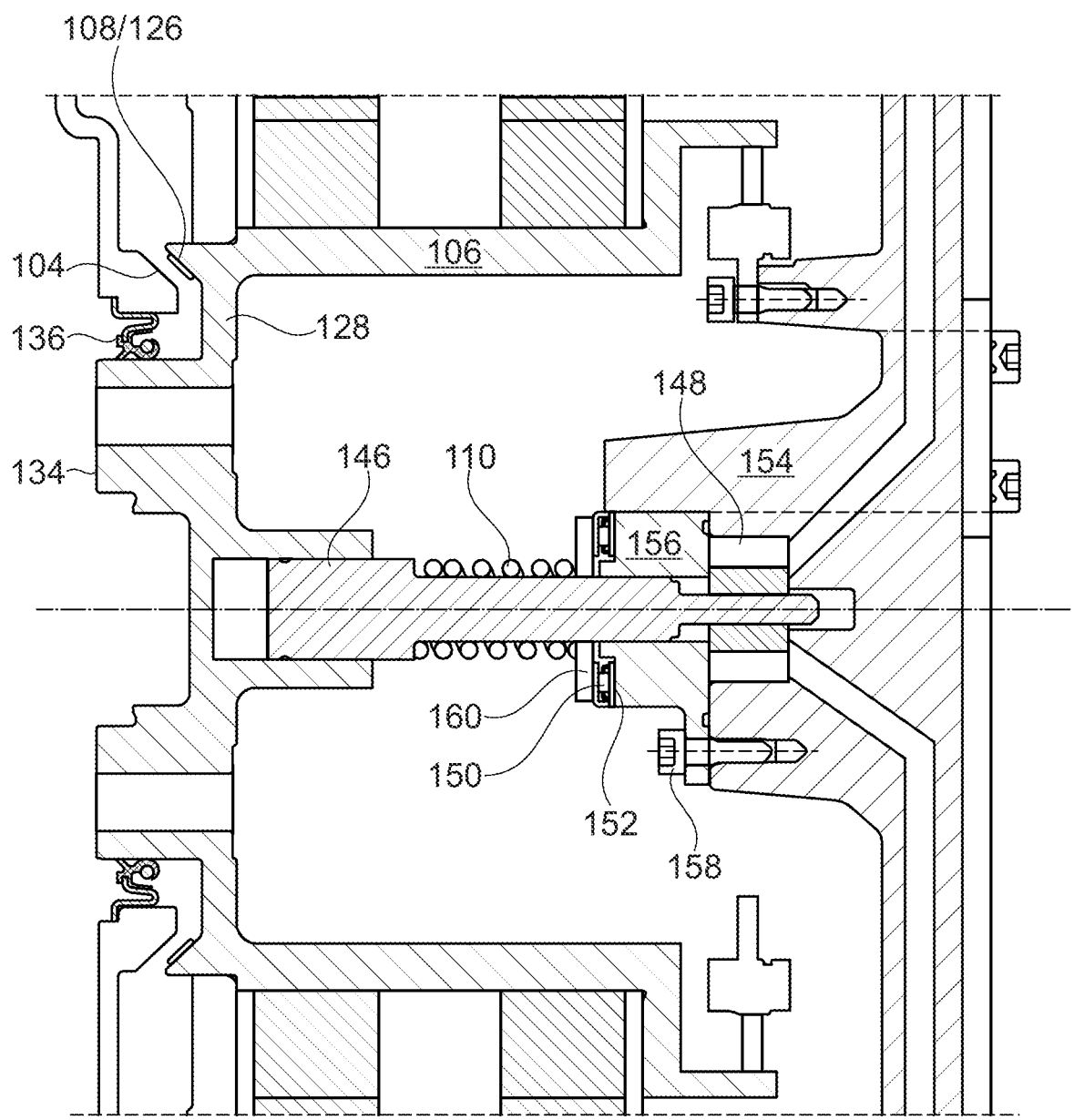
FIG. 2 illustrates a detail view of encircled region 2 in FIG. 1.

The following discussion is made with reference to FIGS. 1-2. FIG. 1 illustrates a cross-sectional view of generator module 100. FIG. 2 illustrates a detail view of encircled region 2 in FIG. 1. Generator module 100 includes housing 102 with conical surface 104, rotor assembly 106 with conical surface 108, aligned with conical surface 104, and spring 110 arranged to push conical surface 108 into contact with conical surface 104. The rotor assembly is a component of electrical generator 112 including stator assembly 114 sealed to the housing at seals 116, for example. Rotor assembly 106 includes segments 118 with magnets and stator assembly 114 includes wire coils 120 that form a brushless configuration of a generator as is known in the art. The housing also includes coolant channels 122 and heat exchanger 124 for cooling the generator module as required.

Module 100 may be used in a vehicle (not shown) to generate electricity to propel the vehicle or provide power to a battery or external devices. Examples of external devices that may be powered by generator 100 include saws, drills, compressors, etc. on a jobsite; air conditioners, microwaves, electronics, etc. in a camper trailer; lights, refrigerators, pumps, etc. in a residential home; or projectors, public address systems, coolers, etc. at an outdoor venue. Although some examples of possible uses for the generator module are provided, countless other applications are possible and should be considered within the scope of this disclosure. Similarly, although module 100 is described as a generator module, module 100 may also be operated as an electric motor. For example, module 100 may act as a starter for a combustion engine or to provide additional torque to a vehicle drivetrain to help propel a vehicle.

When the conical surfaces are in contact, the rotor assembly is both axially and radially positioned relative to the housing and the stator assembly, since the stator assembly is fixed to the housing. This provides an air gap between the rotor assembly and stator assembly when the generator module is not attached to a combustion engine, for example. This air gap prevents damage to the rotor assembly and/or stator assembly during transport to and installation at an engine assembly facility, for example. The module also includes provisions for maintaining the air gap when the module is removed from the engine for service, for example. As described below, once the module is attached to the engine, the air gap is maintained by positioning between an engine crankshaft and engine block, since the rotor assembly is bolted to the crankshaft and the housing is bolted to the engine block.

Conical surface 104 includes plastic surface or friction paper surface 126. That is, a plastic or friction paper ring is fixed (e.g., glued, bonded, bolted, etc.) to rotor carrier 128 of the rotor assembly. As shown in FIG. 1, for example, the underlying surface of the rotor carrier may also be conical shaped. Other embodiments (not shown) may include an annular or cylindrical surface on the rotor carrier with a mating surface on a plastic component that forms conical surface 104. Although surface 126 is shown on rotor assembly 106, other embodiments are possible. For example, surface 126 may be disposed on housing 102.

FIG. 1 shows rotor assembly 106 axially displaced away from housing 102 to separate surfaces 104 and 108. In other words, the rotor assembly is axially displaceable within the housing to compress the spring and move conical surface 108 away from conical surface 104. This displacement occurs when the generator module is bolted to a combustion engine, for example. A distance between an engine block face (not shown) and a crankshaft end face (not shown) is less than distance 130 between surface 132 of housing 102 and surface 134 of rotor assembly 106 so, when the housing is bolted to the engine block, contact between the rotor carrier and the engine crankshaft pushes the rotor carrier to the right in FIG. 1 to separate the conical surfaces. This prevents friction between the conical surfaces during operation of the module in a vehicle. In other words, because the rotor assembly rotates with the crankshaft and the housing is held stationary by the engine block, relative rotation at the conical surfaces would create friction resulting in heat and debris if the rotor assembly was not axially displaced and remained tight against the housing.

Generator module 100 includes seal 136 and the rotor assembly is sealed to the housing by the seal. As shown in the example embodiment, the seal is a lip seal with a metal housing pressed into a bore of the housing and a compliant (e.g., rubber) lip with a garter spring to hold the seal tight against the rotor carrier.

Figure 3:
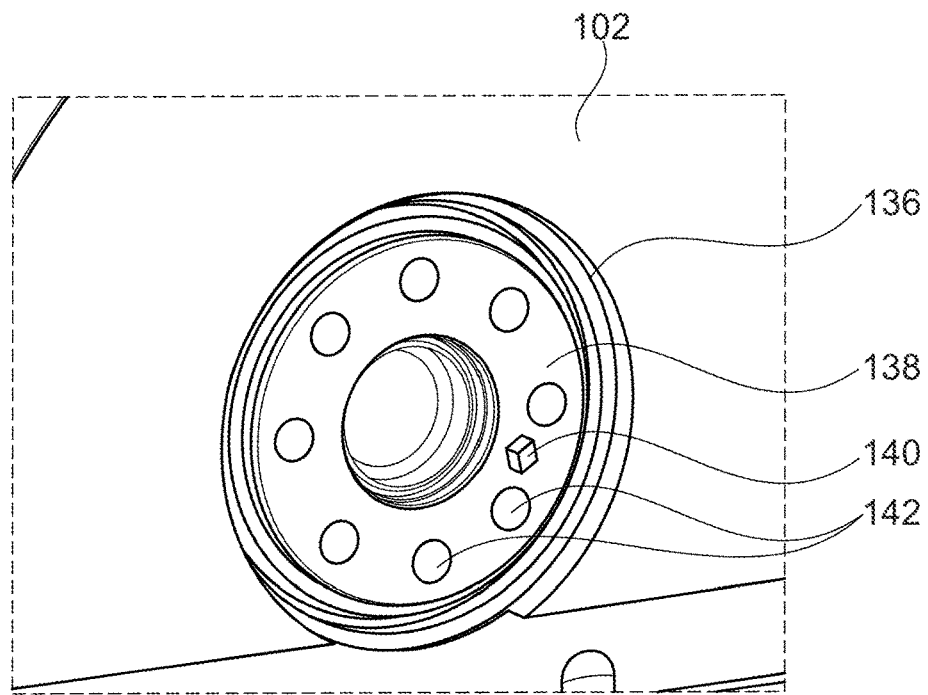
FIG. 3 illustrates a perspective engine-side view of a crankshaft mounting flange and seal.

The following description is made with reference to FIGS. 1-3. FIG. 3 illustrates a perspective engine-side view of a crankshaft mounting flange and seal. As best viewed in FIG. 3, rotor assembly 106 includes mounting flange 138 with axial protrusion 140 arranged for inserting into a receiving hole in an engine crankshaft. That is, in order to maintain proper alignment for bolting the housing flange (with bolts inserted in apertures 142) to a crankshaft, the protrusion is arranged to align in a mating hole or bore of the crankshaft, thereby rotationally positioning apertures 142 with mating (e.g., threaded) holes in the crankshaft that receive the bolts.

Figure 4:
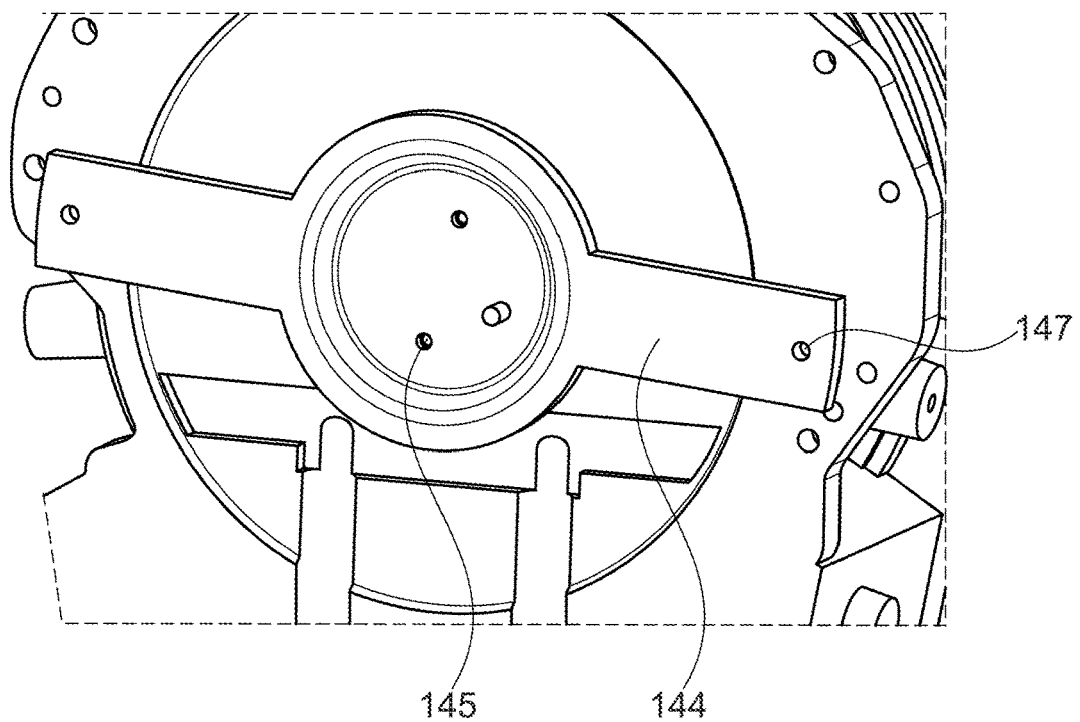
FIG. 4 illustrates a perspective engine-side view of a shipping strap installed on the crankshaft mounting flange and the housing.

The following description is made with reference to FIGS. 1-4. FIG. 4 illustrates a perspective engine-side view of a shipping strap installed on the crankshaft mounting flange and the housing. As viewed in FIG. 4, shipping strap 144 may be fixed to the rotor assembly and to the housing (e.g., with bolts in apertures 145 and 147, respectively) to maintain position of the rotor assembly relative to the housing during transport of the generator module. For example, some acceleration events experienced by the housing during shipping may exceed the frictional force generated by the spring and the mating conical surfaces discussed above. To prevent movement of the rotor assembly (and possible damage to the generator module and/or misalignment with the engine crankshaft during installation with the combustion engine), strap 144 may be attached to the housing and the mounting flange (e.g., by bolts, not shown) to help maintain alignment of the rotor assembly in the housing. Prior to assembly with the engine, the shipping strap is removed.

Returning to FIG. 2, the generator module includes pump shaft 146 rotationally fixed to the rotor assembly, and the spring is arranged to push the pump shaft. That is, as described above, the spring pushes the rotor assembly against the housing. Here, the pump shaft may be press-fit in to the rotor carrier of the rotor assembly or include a stepped surface so that, when the pump shaft is displaced to the left in FIG. 1, the rotor assembly is also displaced. Otherwise stated, the force from the spring pushes the pump shaft which pushes the rotor assembly until conical surface 108 contacts conical surface 104. Generator module 100 also includes gerotor 148 for a gerotor pump (e.g., for cooling the generator module) arranged in the housing, and the pump shaft is rotationally fixed to the gerotor by a press-fit, for example. As shown in FIG. 1, spring 110 is coaxial with the pump shaft.

Generator module 100 includes bearing 150. The housing includes annular wall 152 and the bearing is arranged between the spring and the annular wall. Bearing 150 permits relative rotation of spring 110, arranged on rotatable pump shaft 146, and stationary housing 102. That is, once the generator module is fixed to a combustion engine, the pump shaft rotates with the rotor assembly and/or the crankshaft, but the housing remains stationary. Furthermore, as discussed above, spring 110 is compressed when the module is bolted to the engine. Therefore, bearing 150 provides a low friction interface between the spring and housing that accommodates the spring load. As can be seen in the figure, spring 110 wraps around pump shaft 146.

Housing 102 includes housing body 154, including conical surface 104, and pump cover 156 fixed to the housing body by bolts 158, for example. The pump cover includes annular wall 152. The pump cover is a cover for the gerotor pump discussed above. Generator module 100 also includes washer 160 disposed axially between the spring and the bearing. The washer provides a rigid interface between the spring and the bearing so that loading is distributed evenly on rolling elements in the bearing.

Figure 5:
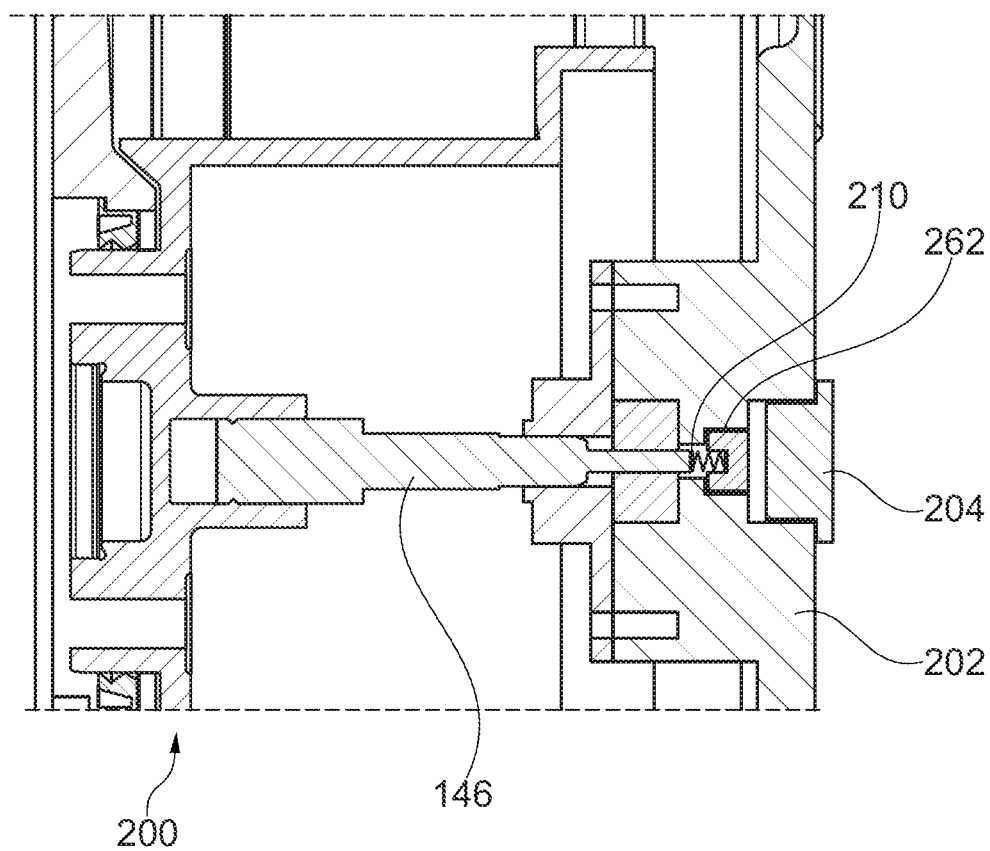
FIG. 5 illustrates a cross-sectional view of a generator module according to a second example embodiment.

The following description is made with reference to FIG. 5. FIG. 5 illustrates a partial cross-sectional view of generator module 200. Generator module 200 is similar to generator module 100 discussed above and 2XX reference numerals in FIG. 5 generally correspond to 1XX reference numerals in FIGS. 1-2 except as described below. Generator module 200 includes threaded plug 262 threaded into housing 202 to compress spring 210 against pump shaft 146. As can be seen in FIG. 5, the threaded plug is coaxial with the pump shaft. Generator module 200 also includes sealing cap 264 installed in the housing.

Sealing cap 264 is removable to access threaded plug 262. That is, generator module 200 is assembled slightly differently than generator module 100 discussed above. Instead of relying on a bearing to carry the spring load, threaded plug 262 can be loosened to removed the spring load and/or the threaded plug and spring can be removed entirely once the module is assembled with a combustion engine. If the spring and plug are removed entirely, the plug and/or cap 264 can be replaced to seal housing 200, if desired. As can be seen in FIG. 5, sealing cap 264 is also coaxial with the pump shaft.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

REFERENCE NUMERALS

100 Generator module
102 Housing
104 Conical surface (first, housing)
106 Rotor assembly
108 Conical surface (second, rotor assy)
110 Spring
112 Electrical generator
114 Stator assembly
116 Seals (stator assembly to housing)
118 Segments
120 Wire coils
122 Coolant channels
124 Heat exchanger
126 Surface (plastic or friction paper)
128 Rotor carrier
130 Distance (housing to rotor assembly)
132 Surface (housing)
134 Surface (rotor assembly)
136 Seal
138 Mounting flange
140 Protrusion (mounting flange)
142 Apertures (mounting flange)
144 Shipping strap
145 Aperture (shipping strap)
146 Pump shaft
147 Aperture (shipping strap)
148 Gerotor
150 Bearing
152 Annular wall
154 Housing body
156 Pump cover
158 Bolts
160 Washer
200 Generator module
202 Housing
210 Spring
262 Threaded plug
264 Sealing cap

What is claimed is:

1. A generator module for a vehicle, comprising:
a housing comprising a first conical surface;
a rotor assembly comprising a second conical surface, aligned with the first conical surface; and
a spring arranged to push the second conical surface into contact with the first conical surface.

2. The generator module of claim 1 wherein the first conical surface or the second conical surface comprises a plastic surface or a friction paper surface.

3. The generator module of claim 1 wherein the rotor assembly is axially displaceable within the housing to compress the spring and move the second conical surface away from the first conical surface.

4. The generator module of claim 1 further comprising a seal, wherein the rotor assembly is sealed to the housing by the seal.

5. The generator module of claim 1 wherein the rotor assembly comprises a crankshaft mounting flange with an axial protrusion arranged for inserting into a receiving hole in an engine crankshaft.

6. The generator module of claim 1 further comprising a shipping strap fixed to the rotor assembly and to the housing to maintain position of the rotor assembly relative to the housing during transport of the generator module.

7. The generator module of claim 1 further comprising a pump shaft rotationally fixed to the rotor assembly, wherein the spring is arranged to push the pump shaft.

8. The generator module of claim 7 further comprising a gerotor for a gerotor pump arranged in the housing, wherein the pump shaft is rotationally fixed to the gerotor.

9. The generator module of claim 7 wherein the spring is coaxial with the pump shaft.

10. The generator module of claim 7 further comprising a bearing, wherein the housing comprises an annular wall and the bearing is arranged between the spring and the annular wall.

11. The generator module of claim 10 wherein the spring wraps around the pump shaft.

12. The generator module of claim 10 wherein the housing comprises:
a housing body comprising the first conical surface; and
a pump cover fixed to the housing body and comprising the annular wall.

13. The generator module of claim 10 further comprising a washer disposed axially between the spring and the bearing.

14. The generator module of claim 7 further comprising a threaded plug, wherein the threaded plug is threaded into the housing to compress the spring against the pump shaft.

15. The generator module of claim 14 wherein the threaded plug is coaxial with the pump shaft.

16. The generator module of claim 14 further comprising a sealing cap installed in the housing, wherein the sealing cap is removable to access the threaded plug.

17. The generator module of claim 16 wherein the sealing cap is coaxial with the pump shaft.

* * * * *